(12) United States Patent
Mishra et al.

(10) Patent No.: US 9,503,338 B2
(45) Date of Patent: Nov. 22, 2016

(54) SYSTEMS AND METHODS TO DETECT AND PROPAGATE UNI OPERATIONAL SPEED MISMATCH IN ETHERNET SERVICES

(71) Applicants: Rajneesh Mishra, Ghaziabad (IN); Mukesh Chhabra, New Delhi (IN); Mohit Batra, Derawal Nagar (IN); Vineet Khera, Uttam Nagar (IN)

(72) Inventors: Rajneesh Mishra, Ghaziabad (IN); Mukesh Chhabra, New Delhi (IN); Mohit Batra, Derawal Nagar (IN); Vineet Khera, Uttam Nagar (IN)

(73) Assignee: Ciena Corporation, Hanover, MD (US)

( * ) Notice: Subject to any disclaimer, the term of this patent is extended or adjusted under 35 U.S.C. 154(b) by 106 days.

(21) Appl. No.: 14/477,029

(22) Filed: Sep. 4, 2014

(65) Prior Publication Data

US 2016/0028602 A1    Jan. 28, 2016

(30) Foreign Application Priority Data

Jul. 24, 2014    (IN) ............................ 2103/DEL/2014

(51) Int. Cl.
| | | |
|---|---|---|
| G06F 11/00 | (2006.01) | |
| H04J 1/16 | (2006.01) | |
| H04L 1/00 | (2006.01) | |
| H04L 12/26 | (2006.01) | |
| H04L 12/709 | (2013.01) | |
| H04L 12/24 | (2006.01) | |

(52) U.S. Cl.
CPC ......... *H04L 43/0811* (2013.01); *H04L 45/245* (2013.01); *H04L 41/0686* (2013.01); *H04L 41/083* (2013.01); *H04L 41/0816* (2013.01); *H04L 43/0882* (2013.01)

(58) Field of Classification Search
CPC ............. H04L 43/0811; H04L 45/245; H04L 41/0686; H04L 41/0816; H04L 41/083; H04L 43/0888; H04L 43/0882

USPC .................. 370/236.2, 241.1, 216–228, 241
See application file for complete search history.

(56) References Cited

U.S. PATENT DOCUMENTS

| | | |
|---|---|---|
| 7,768,928 B2 | 8/2010 | Harel et al. |
| 8,000,241 B2 | 8/2011 | O'Neill |
| 8,081,620 B2 | 12/2011 | Rouyer et al. |
| 8,098,572 B2 | 1/2012 | Zhou et al. |
| 8,166,183 B2 | 4/2012 | Swinkels et al. |
| 8,300,523 B2 | 10/2012 | Salam et al. |
| 2004/0221025 A1* | 11/2004 | Johnson .............. H04L 41/0631 709/223 |
| 2007/0133618 A1 | 6/2007 | Brolin |

(Continued)

OTHER PUBLICATIONS

"Amendment 5: Connectivity Fault Management," IEEE Computer Society, Dec. 17, 2007, pp. 1-260.

(Continued)

*Primary Examiner* — Chuong T Ho
(74) *Attorney, Agent, or Firm* — Clements Bernard PLLC; Christopher L. Bernard; Lawrence A. Baratta, Jr.

(57) ABSTRACT

A method, a network element, and a network operating an Ethernet service include transmitting information related to an operational speed of a first connection to the second switch, wherein the first switch is connected to a first Customer Premises Equipment (CPE) device through the first connection and the second switch is connected to a second CPE device through a second connection; receiving information related to an operational speed of the second connection; and triggering a modification to the Ethernet service, responsive to a mismatch between the operational speed of the first connection and the operational speed of the second connection.

19 Claims, 6 Drawing Sheets

(56) References Cited

U.S. PATENT DOCUMENTS

| | | |
|---|---|---|
| 2010/0325271 A1 | 12/2010 | Krzanowski et al. |
| 2011/0051734 A1 | 3/2011 | Cardona et al. |
| 2012/0113835 A1* | 5/2012 | Alon ................ H04L 43/0817 370/252 |
| 2013/0128750 A1* | 5/2013 | Krzanowski ........ H04L 41/0226 370/241.1 |
| 2014/0071825 A1 | 3/2014 | Chhabra et al. |
| 2014/0133289 A1* | 5/2014 | Jadav ................ H04L 41/0672 370/216 |
| 2015/0281072 A1* | 10/2015 | Arumugam ........ H04L 45/745 370/392 |

OTHER PUBLICATIONS

"OAM functions and mechanisms for Ethernet based networks," ITU-T, Jul. 2011, pp. 1-92.

* cited by examiner

SYSTEMS AND METHODS TO DETECT AND PROPAGATE UNI OPERATIONAL SPEED MISMATCH IN ETHERNET SERVICES

CROSS-REFERENCE TO RELATED APPLICATION(S)

The present patent application/patent claims the benefit of priority of Indian Patent Application No. 2103/DEL/2014, filed on 24 Jul. 2014, and entitled "SYSTEMS AND METHODS TO DETECT AND PROPAGATE UNI OPERATIONAL SPEED MISMATCH IN ETHERNET SERVICES," the contents of which are incorporated in full by reference herein.

FIELD OF THE DISCLOSURE

The present disclosure relates generally to networking systems and methods. More particularly, the present disclosure relates to systems and methods to propagate Link Aggregation Group (LAG) operational speed changes between ports.

BACKGROUND OF THE DISCLOSURE

Carrier Ethernet is evolving to support the needs of the carrier network environment. Carrier Ethernet requires scalable, reliable, and dynamic mechanisms to support operations, administration, and management (OAM) and traffic engineering (TE). Standards have been developed in the Metro Ethernet Forum (MEF), International Telecommunication Union (ITU), Institute of Electrical and Electronics Engineers (IEEE), and the like providing many of these required extensions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (July 2011) "OAM functions and mechanisms for Ethernet based networks," the contents of which are herein incorporated by reference. Further, the MEF also defines Ethernet OAM in various technical specifications, such as MEF 17 (April 2007) "Service OAM Requirements & Framework," the contents of which are herein incorporated by reference. Variously, CFM enables definition of maintenance domains, their constituent maintenance points, and the managed objects required to create and administer them; definition of relationships between maintenance domains and the services offered by Virtual Local Area Network (VLAN)-aware bridges and provider bridges; description of protocols and procedures used by maintenance points to maintain and diagnose connectivity faults within a maintenance domain; and the like.

IEEE 802.3ad Link aggregation (or trunking) is a method of combining multiple physical Ethernet links into a single logical link for increased performance. LAG (Link Aggregation) ports are widely used for client handoff in Layer 2 (L2) networks because of ease of service scalability on live network. Ethernet private line (EPL) are carrier Ethernet data services defined by the Metro Ethernet Forum (MEF). EPL provides a point-to-point Ethernet virtual connection (EVC) between a pair of dedicated user—network interfaces (UNIs), with a high degree of transparency. In the case of EPL services having a LAG on either or both UNI terminations, a change in LAG operational speed due to a link failure or additional/removal of LAG member ports remains unnoticed by a far end L2 switch and Customer premises equipment (CPE). This leads to an operational speed mismatch between terminating UNIs which consequently leads to silent traffic losses on the L2 switch. There are known mechanisms such as Link Loss Forwarding, etc. to propagate UNI link status failures to the far end, enabling action on these notifications for EPL services. Conventionally, there is no solution available to address silent traffic loss because of LAG UNI operational speed changes due to a link/Link Aggregation Control Protocol (LACP) failure on a few but not all LAG members. In these cases, on LAG UNI-based EPL services, LAG operational speed reduction (because of run-time LAG distribution changes) at the near end UNI remains unnoticed to the far end UNI termination and vice versa. Consequently the near end, operating at a lower speed now, would start dropping traffic coming from the far end UNI. This failure is silent to the far end.

BRIEF SUMMARY OF THE DISCLOSURE

In an exemplary embodiment, a method at a first switch operating an Ethernet service with a second switch includes transmitting information related to an operational speed of a first connection to the second switch, wherein the first switch is connected to a first Customer Premises Equipment (CPE) device through the first connection and the second switch is connected to a second CPE device through a second connection; receiving information related to an operational speed of the second connection; and triggering a modification to the Ethernet service, responsive to a mismatch between the operational speed of the first connection and the operational speed of the second connection. At least one of the first connection and the second connection can include a Link Aggregation Group (LAG). The information can include port type of either a physical port or an aggregated port, speed of a physical port in case of the physical port or speed of each aggregated port in the case of the aggregated port, and a count of active Link Aggregation Group (LAG) members in the case of the aggregated port. The method can further include configuring a Maintenance Association with the second switch with an UP Maintenance End Point (MEP) at the first connection and the second connection; and exchanging the information through the Maintenance Association as part of Connectivity Fault Management (CFM) IEEE 802.1ag Continuity Check Message (CCM) packets.

The method can further include configuring a second Maintenance Association with the first CPE device, wherein the second Maintenance Association can include a DOWN MEP; and exchanging the information related to the operational speed of the second connection through the second Maintenance Association; wherein a third Maintenance Association is configured between the second switch and the second CPE device, wherein the third Maintenance Association can include a DOWN MEP, and wherein the information related to the operational speed of the first connection can be exchanged through the third Maintenance Association. The Maintenance Association can be configured with a lower Maintenance Domain than the second Maintenance Association and the third Maintenance Association. The method can further include modifying quality-of-service attributes at one or more of the first switch and the second switch, subsequent to the mismatch. The method can further include modifying quality-of-service attributes at one or more of the first CPE device and the second CPE device, subsequent to the mismatch. The method can further include exchanging the information related to the operational speed of the first connection and the information related to the operational speed of the second connection through organization specific Type-Length-Value fields in Continuity Check Messages.

In another exemplary embodiment, a network element includes a first port communicatively coupled to a far end switch forming an Ethernet service there between; at least one additional port communicatively coupled to a Customer Premises Equipment (CPE) device; wherein the network element is configured to: transmit information related to an operational speed of the at least one additional port coupled to the CPE device; receive information related to an operational speed of a connection between the far end switch and a second CPE device; and trigger a modification to the Ethernet service, responsive to a mismatch between the operational speed of the at least one additional port coupled to the CPE device and the an operational speed of the connection. The at least one of the at least one additional port and the connection can include a Link Aggregation Group (LAG). The information can include port type of either a physical port or an aggregated port, speed of a physical port in case of the physical port or speed of each aggregated port in the case of the aggregated port, and a count of active Link Aggregation Group (LAG) members in the case of the aggregated port. A Maintenance Association can be configured between the network element and the far end switch; and wherein the information can be exchanged through the Maintenance Association as part of Connectivity Fault Management (CFM) IEEE 802.1ag Continuity Check Message (CCM) packets with an UP Maintenance entity group End Point (MEP).

A second Maintenance Association is configured between the at least one additional port and the CPE device, wherein a third Maintenance Association is configured between the far end switch and the second CPE device, wherein the second Maintenance Association and the third Maintenance Association can include a DOWN MEP; wherein the information related to the operational speed of the at least one additional port coupled to the CPE device can be provided through the third Maintenance Association; and wherein the information related can be the operational speed of the connection is provided through the second Maintenance Association. The Maintenance Association can be configured with a lower Maintenance Domain than the second Maintenance Association and the third Maintenance Association. The network element can be configured to modify quality-of-service attributes of the Ethernet service responsive to the mismatch. The network element can be configured to transmit the information and receive the information through organization specific Type-Length-Value fields in Continuity Check Messages.

In yet another exemplary embodiment, a network includes a first switch; a second switch connected to the first switch forming an Ethernet service; a first Customer Premises Equipment (CPE) device connected to the first switch via a first connection; and a second CPE device connected to the second switch via a second connection, wherein the second CPE device communicates to the first CPE device over the Ethernet service; wherein the first switch and the second switch are configured to exchange information related to an operational speed of the first connection to the second switch and information related to an operational speed of the second connection to the first switch respectively; and wherein at least one of the first switch and the second switch is configured to trigger a modification to the Ethernet service, responsive to a mismatch between the operational speed of the first connection and the operational speed of the second connection. The first switch and the second switch can exchange the information through organization specific Type-Length-Value fields in Continuity Check Messages. The at least one of the first connection and the second connection can include a Link Aggregation Group (LAG).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods to propagate LAG speed mismatches on UNI ports for symmetric EPL services are described. As described herein, the LAG speed mismatches are propagated to the UNI ports meaning that the UNI ports communicate their speeds to peers such that the mismatches can be detected. That is, propagate means to communicate, notify, etc. The systems and methods use IEEE 802.1ag Ethernet Connectivity Fault Management (CFM) Continuity Check Message (CCM) functionality to propagate UNI operational speed to the far end. An UP Maintenance End Point (MEP) is created over UNI to transmit CCMs periodically into the network. IEEE 802.1ag-compliant CCM Organization Specific Type-Length-Value (TLV) fields are used to propagate various attributes of the client facing UNI interface such as i) Physical Port or Aggregation Port, ii) Speed of Physical port (in case of physical port) or speed of individual LAG member (in case of LAG), and iii) Count of active LAG members (significant for Aggregation port only). A Maintenance Association (MA) is configured on switches interfacing to a customer with UP MEPs on local and remote UNI ports for VLAN tagged L2 services running over this EPL circuit. CCMs can carry UNI operational speed within organization specific TLV fields. A CFM engine can process the incoming CCMs, calculate the remote UNI speed based on TLV content, and trigger a modification including raising an "UNI operational speed mismatch" alarm if remote UNI operational speed mismatches with operational speed of local UNI and/or modifying service parameters. The switches, via application software, can take implementation specific corrective action over an "UNI operational speed mismatch" alarm notification so that symmetrical operation of EPL service may be maintained. The systems and methods can include both manual and automatic mechanisms to turn on UNI speed propagation over L2 networks. The systems and methods help LAG UNI-based EPL services through fast propagation of LAG operational speed changes (because of run-time changes in LAG distribution) to far end and let far end raise an "UNI operational speed mismatch" alarm on operator alarm panel. The systems and methods can build over this "UNI operational speed mismatch" alarm to take corrective action to ensure symmetric operation of EPL service is maintained and high priority traffic does not get dropped.

Figure 1:
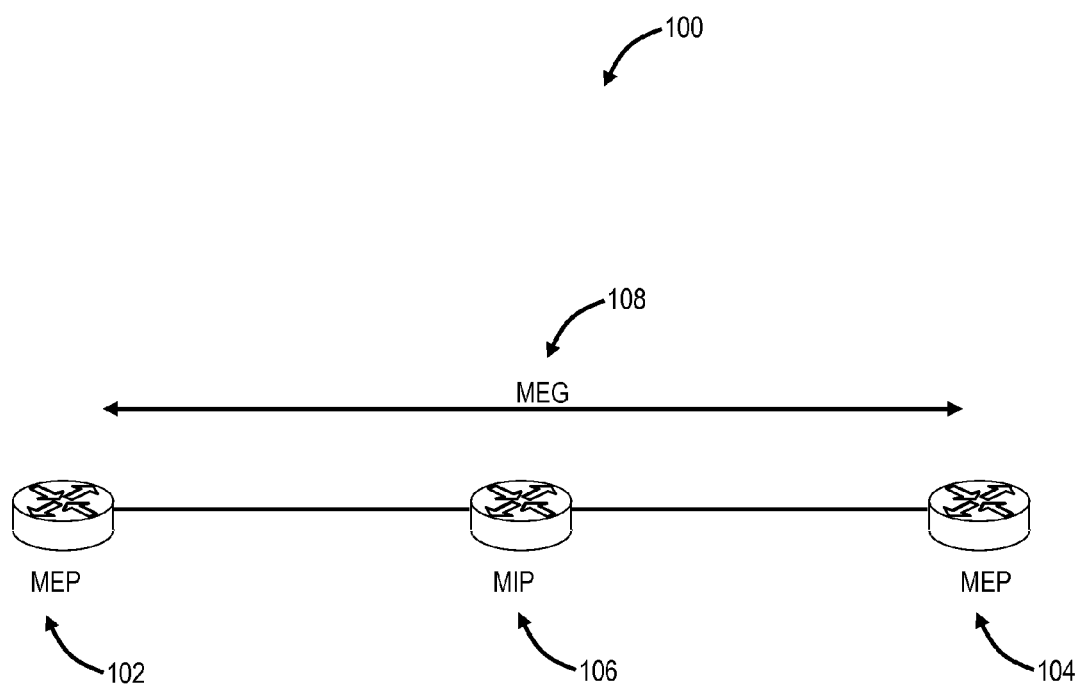
FIG. 1 is a network diagram of an exemplary Ethernet network configured with Carrier Ethernet OAM mechanisms.

Referring to FIG. 1, in an exemplary embodiment, a network diagram illustrates an exemplary Ethernet network 100 configured with Carrier Ethernet OAM mechanisms. For illustration purposes, the Carrier Ethernet network 100 includes three interconnected network elements 102, 104, 106. The network 100 includes Carrier Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages exchanged between the network elements, specifically and in particular each MEP that provides origination and termination of the service transport path(s) for a MEG. The network elements 102, 104 are defined as a MEG End Point (MEP). In CFM, a MEP is configured to source and sink CFM frames, i.e. source and sink within a single configured MD (Maintenance Domain), pass-thru if MD Level is higher than the configured level for the MEP, and discard if MD Level is lower. The MEPs 102, 104 are also configured to participate in performance monitoring such as through CCMs. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e. the MIP 106 is communicatively coupled between the MEPs 102, 104. A MIP is configured to process and forward CFM frames, but does not initiate CFM frames. The Carrier Ethernet systems and methods contemplate implementation and operation on Carrier Ethernet networks such as those compliant to IEEE 802.1ag-2007, G.8013/Y.1731, and/or MEF. Of note, IEEE 802.1ag-2007 and G.8013/Y.1731 both relate to and define CFM for Ethernet OAM. Various terminology utilized herein, such as MEP, MIP, CCM, Protocol Data Unit (PDU), etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MA 108, the MA 108 could also be referred to as the MEG 108. Generally, the MA 108 and MEG relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering both the constructs of IEEE 802.1ag-2007, G.8013/Y.1731, MEF.

The network elements 102, 104, 106 are configured in a MA 108 which enable a grouping of nodes in a maintenance group for OAM to be grouped on different spans. The MA 108 is a set of MEPs, each configured with a same unique MEG ID code (UMC) and MEG Level or Maintenance Association Identifier (MAID) and Maintenance Domain (MD) level. The MA 108 may be thought of as a full mesh a Maintenance Entities (MEs), the MEs including MEPs, MIPs, etc., with a set of MEPs configured therebetween. The UMC is a unique identifier for the MA 108 domain. Additionally, the MA 108 allows for nesting of various groups. The MEG Level and the MD is a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios. As described herein, the various Carrier Ethernet systems and methods may be applied to per-node MEPs, per-interface MEPs, or per-port MEPs. Specifically, a per-node MEP applies to an entire network element whereas per-interface and per-port MEPs are for a single provisioned service on the network element.

MEPs can be characterized as UP MEPs or DOWN MEPs. If an OAM flow is being sent out a specific port (UNI or NNI), such as with the UNI ME or an E-NNI ME, the MEP is called a DOWN MEP. OAM flows from a DOWN MEP are always initiated through the same port. If an OAM is being sent to a destination in the network, such as with an Ethernet Virtual Circuit (EVC) ME, the MEP is called an UP MEP. The path taken by OAM flows from an UP MEP can change if the network topology changes, e.g., due to the addition, removal, or failure of a path. For a DOWN MEP, think of sending OAM packets to port x. For an UP MEP, think of sending OAM packets to address y or on VLAN z. In other words, if the provider edge is an Ethernet Switch, "up" OAM flows are sent into the switch, for forwarding like a data frame.

Figure 2:
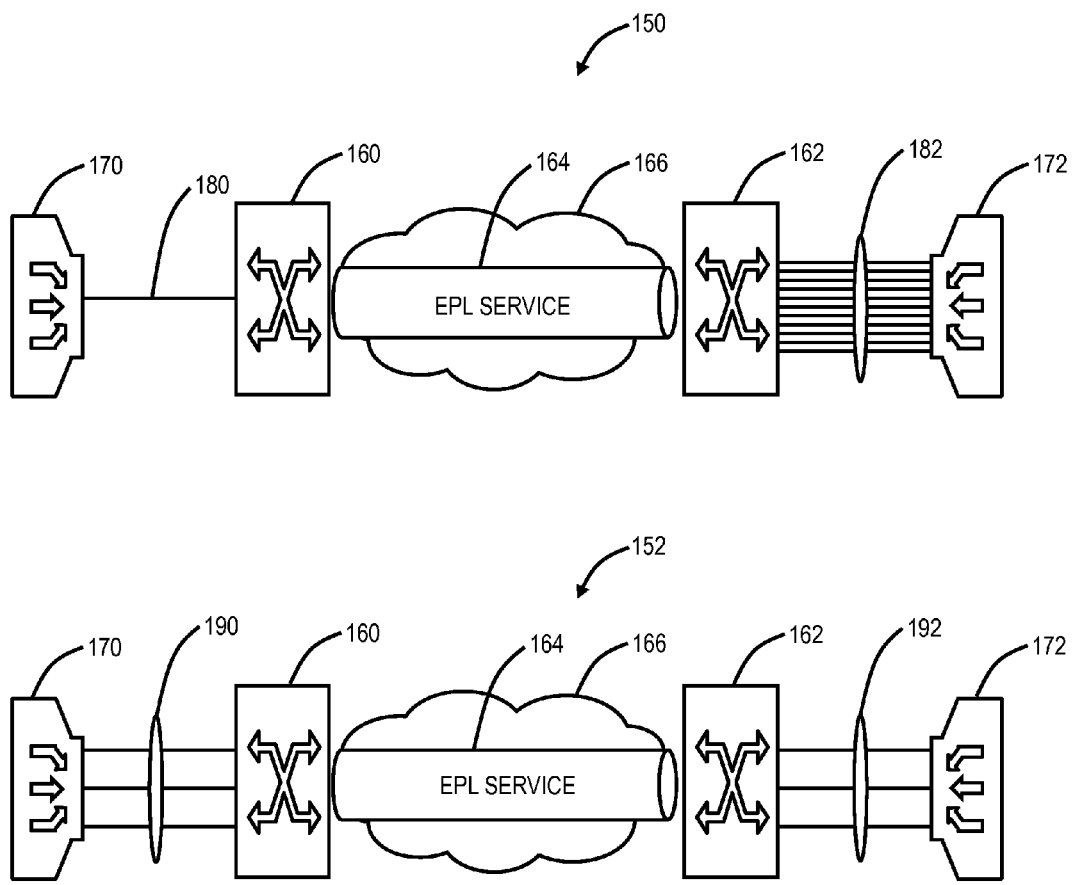
FIG. 2 is network diagrams of networks of exemplary LAG deployment scenarios.

Referring to FIG. 2, in an exemplary embodiment, network diagrams illustrate networks 150, 152 of exemplary LAG deployment scenarios. The networks 150, 152 include switches 160, 162 forming an EPL service 164 through a L2 network 166. The networks 150, 152 also include CPE devices 170, 172 with the CPE device 170 connected to the switch 160 and the CPE device 172 connected to the switch 162. The network 150 includes 10G of bandwidth between the CPE devices 170, 172 on the EPL service 164. The network 150 includes a single 10G physical link 180 between the CPE device 170 and the switch 160 and a UNI LAG 182 with 10×1G links between the CPE device 172 and the switch 162. The network 152 includes 3G of bandwidth between the CPE devices 170, 172 on the EPL service 164. The network 152 includes UNI LAGs 190, 192 with 3×1G between each of the CPE devices 170, 172 and the switches 160, 162. Thus, in both the networks 150, 152, the aggregated operational speed is the same at both ends. During turn-on, the UNI LAGs 182, 190, 192 are configured at a corresponding aggregated speed to achieve symmetrical operations.

Figure 3:
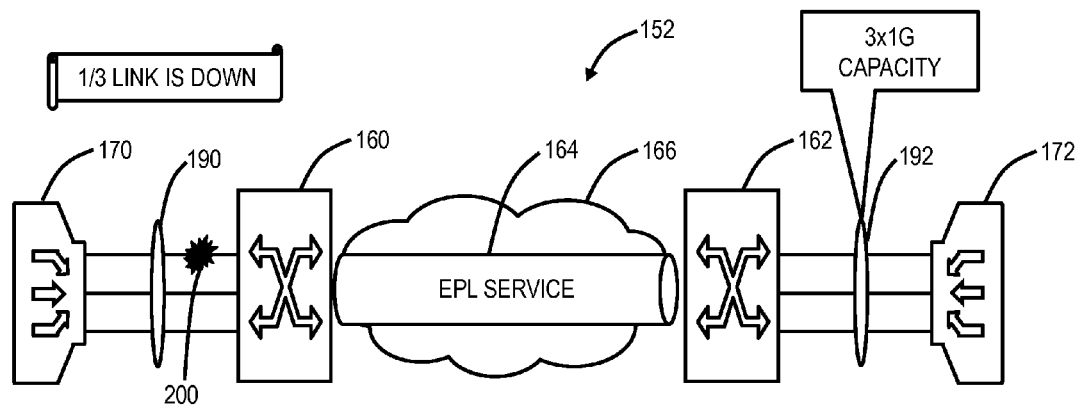
FIG. 3 is a network diagram of a network to describe conventional silent failures.

Referring to FIG. 3, in a conventional embodiment, a network diagram illustrates the network 152 to describe conventional silent failures. In this example, the UNI LAG 190 suffers a failure 200 on one of its three ports, thus this is a LAG with 1/3 links down. This can be failure 200 can occur when one or more aggregated links goes out of distribution (i.e., trunking) because of link down or LACP failure. In case of the EPL service 164 having LAG on either or both UNI terminations, a change in LAG operational speed due to link failure or additional/removal of LAG member ports remain unnoticed by the far end L2 switch 162 and the CPE 172. This leads to an operational speed mismatch between terminating UNIs. Consequently silent traffic loss would be seen on the switches 160, 162. Specifically, the UNI LAG 192 sees 3×1G capacity while the UNI LAG 190 only sees 2×1G capacity.

Figure 4:
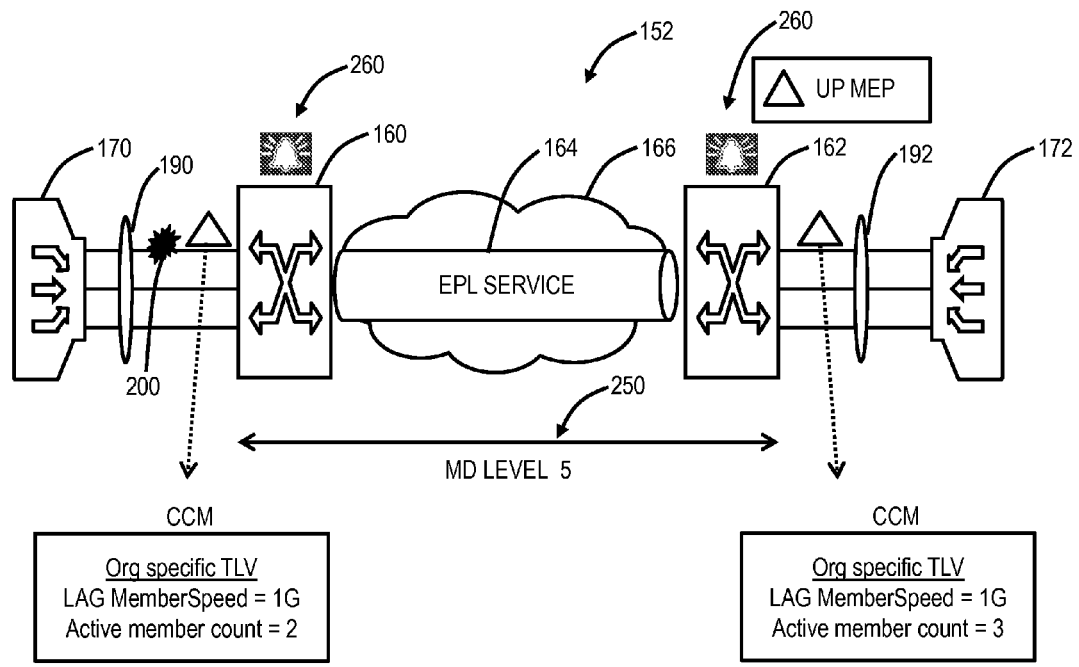
FIG. 4 is a network diagram of the network of FIG. 3 to describe the systems and methods to propagate LAG speed mismatches on UNI ports for EPL services between the switches.

Referring to FIG. 4, in an exemplary embodiment, a network diagram illustrates the network 152 to describe the systems and methods to propagate LAG speed mismatches on UNI ports for EPL services between the switches 160, 162. In this example, the UNI LAG 190 suffers the same failure 200 as in FIG. 3. However, the switches 160, 162 are configured in an MA (e.g., MD level 5) with an UP MEP 250. The switches 160, 162 are each configured as a MEP in the MA 250 in an UP MEP. Using the UP MEP 250, CCM messages are exchanged between the switches 160, 162. The CCM messages encapsulate Organization specific TLVs containing information about aggregation state. This information is used for raising alarms 260 for "UNI operational speed mismatch". The network 152 can trigger a modification to the Ethernet service, responsive to the mismatch between the operational speed of the first connection (the UNI LAG 190) and the operational speed of the second connection (the UNI LAG 192). This modification can be (a) where the alarm 260 is raised and the modification is made after receiving input from a user/operator; or (b) where the modification is made automatically.

In this example, the switch 160 provides CCM messages with Organization specific TLVs stating LAG Member speed of 1G and active member count of 2 (because of the failure 200). The switch 162 provides CCM messages with Organization specific TLVs stating LAG Member speed of 1G and active member count of 3. Accordingly, at least one of both the switches 160, 162 can raise the alarm 260 and modify Quality-of-Service (QoS) attributes to drop lower priority traffic based on the mismatch.

Figure 5:
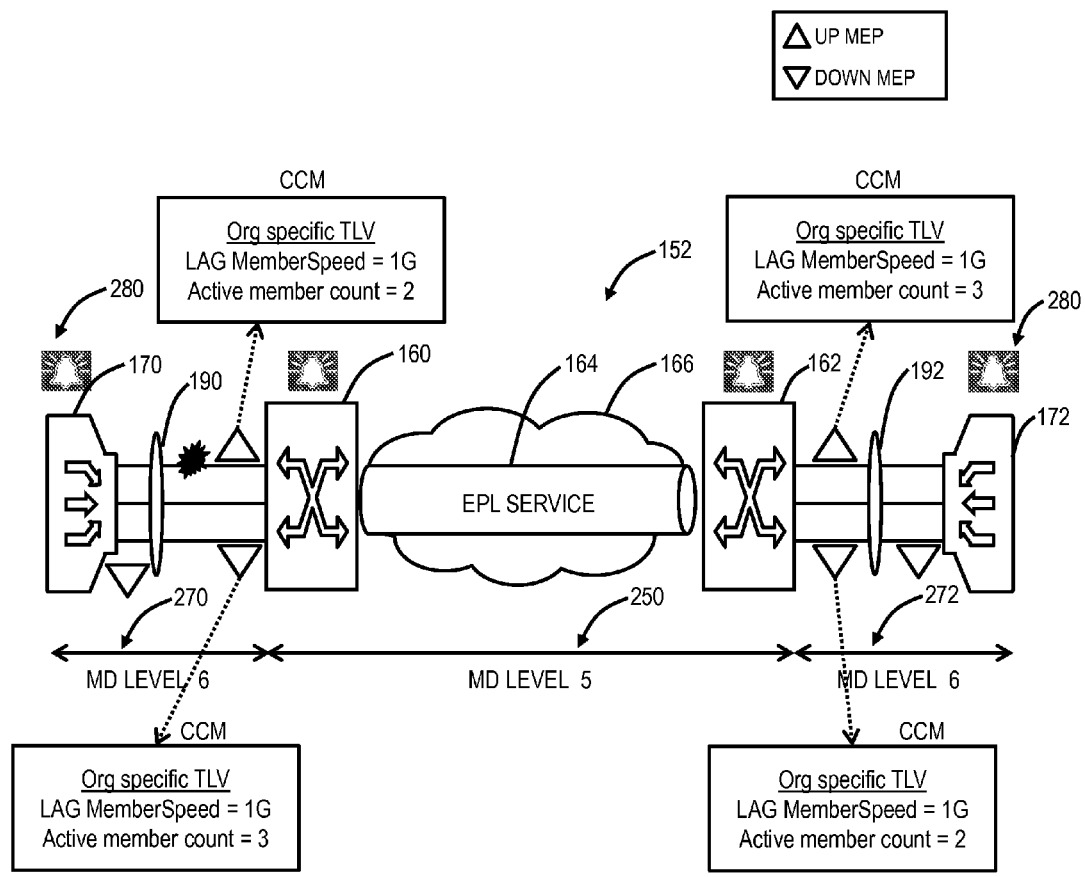
FIG. 5 is a network diagram of the network of FIG. 3 to describe the systems and methods to propagate LAG speed mismatches on UNI ports for EPL services between the switches and the CPE devices.

Referring to FIG. 5, in an exemplary embodiment, a network diagram illustrates the network 152 to describe the systems and methods to propagate LAG speed mismatches on UNI ports for EPL services between the switches 160, 162 and the CPE devices 170, 172. This example is similar to FIG. 4, but includes an additional DOWN MEP 270, 272 between the switches 160, 162 and the CPE devices 170, 172. The CCM messages are exchanged on the UP MEP 250 as described in FIG. 4, and further used to propagate to the CPE devices 170, 172. In this example, the switch 160 provides CCM messages with Organization specific TLVs stating LAG Member speed of 1G and active member count of 2 (because of the failure 200). The switch 162 provides CCM messages with Organization specific TLVs stating LAG Member speed of 1G and active member count of 3. On the DOWN MEP 270, the switch 160 provides CCM messages with Organization specific TLVs stating LAG Member speed of 1G and active member count of 3 to inform the CPE 170 of the status of the UNI LAG 192. On the DOWN MEP 272, the switch 162 provides CCM messages with Organization specific TLVs stating LAG Member speed of 1G and active member count of 2 to inform the CPE 172 of the status of the UNI LAG 190. Accordingly, the "UNI operational speed mismatch" alarm 260, 280 on both the switches 160, 162 and the CPE devices 170, 172.

In FIG. 4, the switches 160, 162 have the information regarding the UNI operational speed mismatch, and act on it. In FIG. 5, the UNI operational speed mismatch is propagated to the CPE devices 170, 172, and the CPE devices 170, 172 can act on it. For example, if CPE devices 170, 172 are capable of interpreting remote UNI information within this organization specific TLV, the switches 160, 162 can take advantage of IEEE 802.1ag CFM DOWN MEP based CCM functionality. The DOWN MEPs 270, 272 are created at two ends of UNI (at an MD level higher than the MD level of the UP MEP 250 over same LAG UNI) and CCMs carrying this organization specific TLV are periodically exchanged to propagate far end UNI operational speed to the CPE devices 170, 172. This way the CPE devices 170, 172 are aware of far end client terminating UNI operational speed and are able to adapt appropriately.

The system and methods use IEEE 802.1ag UP MEP based CCM functionality to propagate UNI operational speed to far end by using a new organization specific TLV which can be defined as, in an exemplary embodiment:

| Type = 31 (1 Byte) | Length (2 Bytes) | OUI (3 Bytes) | Sub-type (1 Byte) | Port Type (1 Byte) | Operational Speed (4 Bytes) | Active LAG Member Count (1 Byte) |
|---|---|---|---|---|---|---|

| TLV fields | Information carried |
|---|---|
| Length | Length of TLV Value |
| OUI | Organizationally Unique Identifier obtainable from IEEE |
| Sub Type | Sub Type shall be implementation specific depending on number of organization specific TLVs encapsulated within the CCM frame |
| Port Type | Nature of UNI port over which UP MEP has been created<br>Physical Port = 0<br>Aggregation Port = 1 |
| LAG Member Speed | Operational speed of physical port or individual LAG member in Mbps.<br>IEEE 802.3ad recommends that operational speed of all LAG members must be same. |
| Active LAG Member Count | Count of active LAG members<br>Implementation should ensure that application should provide correct value of this attribute to CFM application. |

In addition to passing the operational speed between UNI LAGs, the aforementioned TLV supports passing the operational speed of Physical Port Based UNI as well as EPL services having LAG UNI on one side and Physical port based UNI on the other side.

The systems and methods can support a manual or an automatic mechanism to turn on this capability. For the manual mechanism, on the creation of the EPL service 164 over LAG clients, a user can explicitly create a MA at a desired MD level and create UP MEPs at LAG clients. The user can ensure that MEPs are up and each MEP has discovered its remote MEP correctly. Once complete, the CCM messages from the UP MEPs carry UNI attributes in organization specific TLV in the above mentioned format, for example. The systems and methods can include implementing a flag to turn on/off this TLV.

For the automatic mechanism, the user can implement an automatic mechanism to associate UNI clients of the EPL service 164 with a CFM service by adding some configurable parameters (e.g., MD level, MA name, MA format, CCM interval, etc.) during EPL service creation. Based on the configured values, software can automatically start CCM message transmission from UNI client. The CCM messages can use the organizational specific TLV to carry UNI attributes.

In either mechanism, a receiver of the CCM message can calculate the remote UNI operational speed as below:

Remote UNI speed=Physical port operational speed
in case the UNI is non-LAG, or Active LAG
Members count*Individual LAG member speed
in case the UNI is LAG.

The CFM engine can compare this value with its local value and report an "UNI operational speed mismatch" alarm if there is an operational speed mismatch detected. This alarm can be cleared when the UNI LAG recovers and terminating UNIs can resume operation at symmetrical operational speed.

Figure 6:
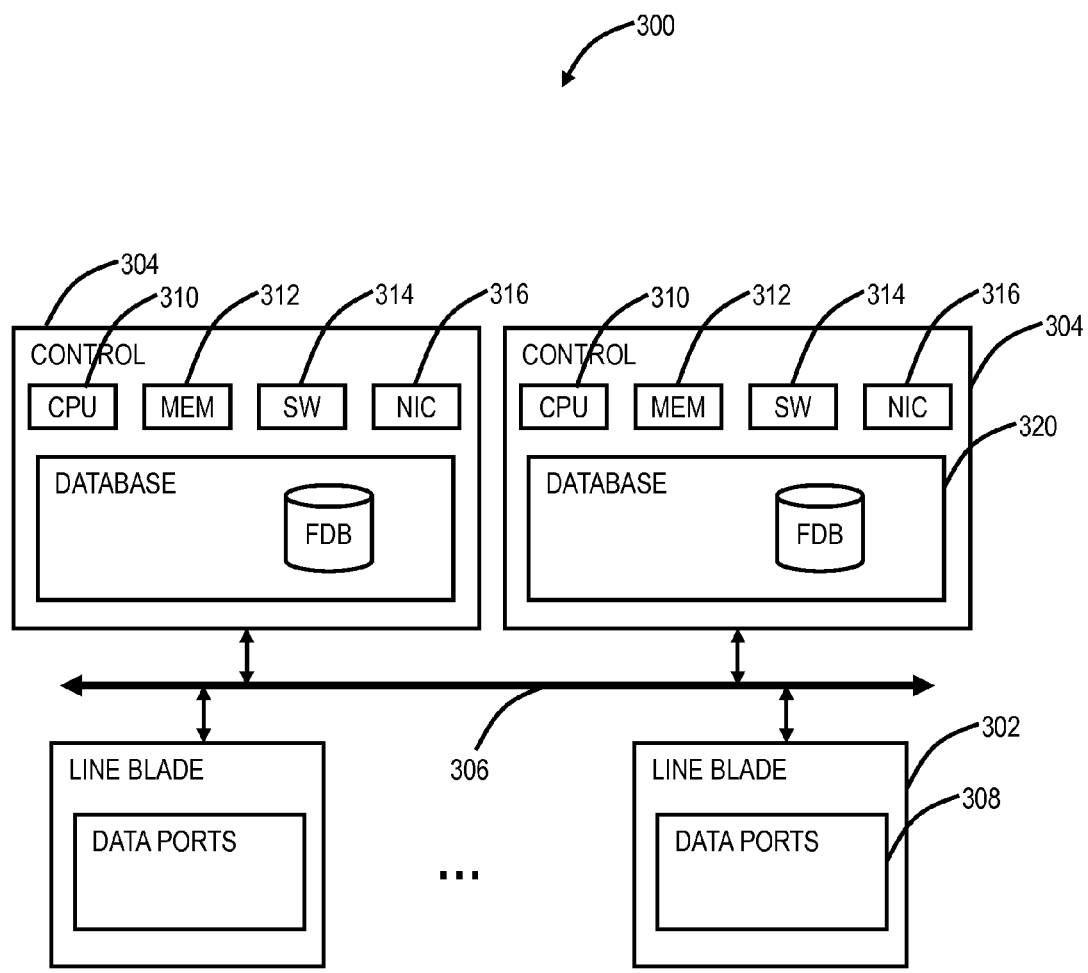
FIG. 6 is a block diagram of an exemplary implementation of a switch.

Referring to FIG. 6, in an exemplary embodiment, a block diagram illustrates an exemplary implementation of a switch 300. In this exemplary embodiment, the switch 300 is an Ethernet network switch, but those of ordinary skill in the art will recognize the systems and methods described herein contemplate other types of network elements and other implementations. In this exemplary embodiment, the switch 300 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e., the switch 300. Each of the blades 302, 304 can include numerous electronic devices and optical devices mounted on a circuit board along with various interconnects including interfaces to the chassis, shelf, etc.

Two exemplary blades are illustrated with line blades 302 and control blades 304. The line blades 302 generally include data ports 308 such as a plurality of Ethernet ports. For example, the line blade 302 can include a plurality of physical ports disposed on an exterior of the blade 302 for receiving ingress/egress connections. Additionally, the line blades 302 can include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the switch 300 out by the correct port 108 to the next switch 300. "Switching fabric" includes switching units, or individual boxes, in a node; integrated circuits contained in the switching units; and programming that allows switching paths to be controlled. Note, the switching fabric can be distributed on the blades 302, 304, in a separate blade (not shown), or a combination thereof. The line blades 302 can include an Ethernet manager (i.e., a CPU) and a network processor (NP)/application specific integrated circuit (ASIC). As described herein, the line blades 302 can participate in the systems and methods described herein.

The control blades 304 include a microprocessor 310, memory 312, software 314, and a network interface 316. Specifically, the microprocessor 310, the memory 312, and the software 314 can collectively control, configure, provision, monitor, etc. the switch 300. The network interface 316 may be utilized to communicate with an element manager, a network management system, etc. Additionally, the control blades 304 can include a database 320 that tracks and maintains provisioning, configuration, operational data and the like. The database 320 can include a forwarding database (FDB). In this exemplary embodiment, the switch 300 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the switch 300. In an exemplary embodiment, the network elements 102, 104, 106, the switches 160, 162, and the CPE devices 170, 172 can utilize an architecture similar to the switch 300; although other embodiments are also contemplated.

Figure 7:
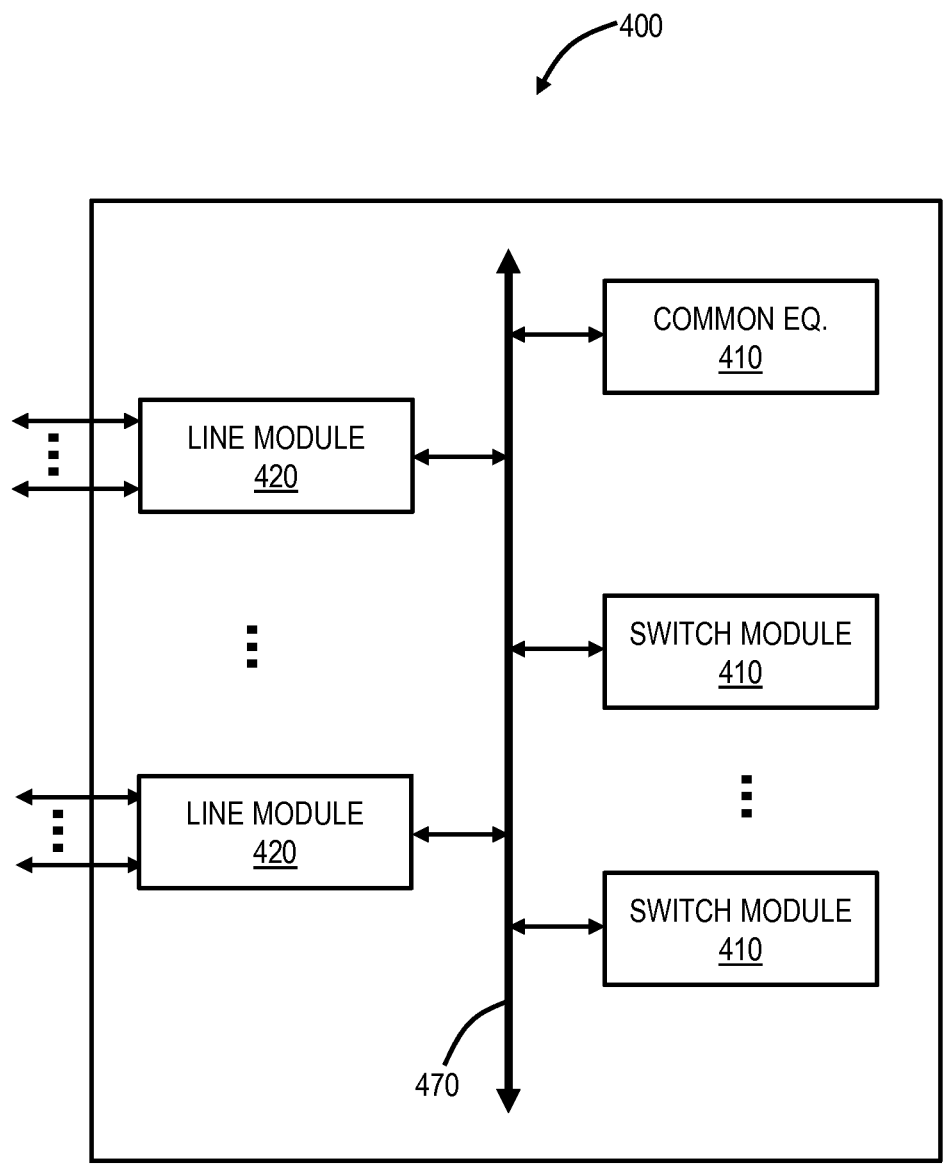
FIG. 7 is a block diagram of another exemplary implementation of a network element.

Referring to FIG. 7, in an exemplary embodiment, a block diagram illustrates another exemplary implementation of a network element 400. For example, the switch 300 can be a dedicated Ethernet switch whereas the network element 400 can be a multiservice platform. In an exemplary embodiment, the network element 400 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 400 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 400 can be any system with ingress and egress signals and switching therebetween of channels, timeslots, tributary units, wavelengths, etc. While the network element 400 is generally shown as an optical network element, the load balancing systems and methods are contemplated for use with any switching fabric, network element, or network based thereon. Also, the systems and methods can work with Ethernet UNI connections and Ethernet or Ethernet over OTN NNI connections.

In an exemplary embodiment, the network element 400 includes common equipment 410, one or more line modules 420, and one or more switch modules 430. The common equipment 410 can include power; a control module; operations, administration, maintenance, and provisioning (OAM&P) access; and the like. The common equipment 410 can connect to a management system such as a network management system (NMS), element management system (EMS), or the like. The network element 400 can include an interface 470 for communicatively coupling the common equipment 410, the line modules 420, and the switch modules 430 there between. For example, the interface 470 can be a backplane, mid-plane, a bus, optical or electrical connectors, or the like. The line modules 420 are configured to provide ingress and egress to the switch modules 430 and external to the network element 400. In an exemplary embodiment, the line modules 420 can form ingress and egress switches with the switch modules 430 as center stage switches for a three-stage switch, e.g., a three stage Clos switch. The line modules 420 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 420 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the network element 400, and each line module 420 can include one or more physical ports. The switch modules 430 are configured to switch channels, timeslots, tributary units, wavelengths, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 430 can include both Time Division Multiplexed (TDM) (i.e., circuit switching) and packet switching engines. The switch modules 430 can include redundancy as well, such as 1:1, 1:N, etc.

Those of ordinary skill in the art will recognize the switch 300 and the network element 400 can include other components which are omitted for illustration purposes, and that the systems and methods described herein are contemplated for use with a plurality of different nodes with the switch 300 and the network element 400 presented as an exemplary implementations. For example, in another exemplary embodiment, a network element may not include the switch modules 430, but rather have the corresponding functionality in the line modules 420 (or some equivalent) in a distributed fashion. For the switch 300 and the network element 400, other architectures providing ingress, egress, and switching there between are also contemplated for the systems and methods described herein. In general, the systems and methods described herein contemplate use with any node providing switching or forwarding of packets.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method at a first switch operating an Ethernet service with a second switch, comprising:
   transmitting, by the first switch, information related to an operational speed of a first connection to the second switch, wherein the first switch is connected to a first Customer Premises Equipment (CPE) device through the first connection and the second switch is connected to a second CPE device through a second connection, and wherein the Ethernet service is between one or more ports on each of the first switch and the second switch;
   receiving, by the first switch, information related to an operational speed of the second connection; and
   triggering, by the first switch, a modification to the Ethernet service, responsive to a mismatch between the operational speed of the first connection and the operational speed of the second connection;
   configuring a Maintenance Association with the second switch with an UP Maintenance End Point (MEP) at the first connection and the second connection; and
   exchanging the information through the Maintenance Association as part of Connectivity Fault Management (CFM) IEEE 802.1ag Continuity Check Message (CCM) packets.

2. The method of claim 1, wherein at least one of the first connection and the second connection comprises a Link Aggregation Group (LAG).

3. The method of claim 1, wherein the information comprises port type of either a physical port or an aggregated port, speed of a physical port in case of the physical port or speed of each aggregated port in the case of the aggregated port, and a count of active Link Aggregation Group (LAG) members in the case of the aggregated port.

4. The method of claim 1, further comprising:
configuring a second Maintenance Association with the first CPE device, wherein the second Maintenance Association comprises a DOWN MEP; and
exchanging the information related to the operational speed of the second connection through the second Maintenance Association;
wherein a third Maintenance Association is configured between the second switch and the second CPE device, wherein the third Maintenance Association comprises a DOWN MEP, and wherein the information related to the operational speed of the first connection is exchanged through the third Maintenance Association.

5. The method of claim 4, wherein the Maintenance Association is configured with a lower Maintenance Domain than the second Maintenance Association and the third Maintenance Association.

6. The method of claim 1, further comprising:
modifying quality-of-service attributes at one or more of the first switch and the second switch, subsequent to the mismatch.

7. The method of claim 1, further comprising:
modifying quality-of-service attributes at one or more of the first CPE device and the second CPE device, subsequent to the mismatch.

8. The method of claim 1, further comprising:
exchanging the information related to the operational speed of the first connection and the information related to the operational speed of the second connection through organization specific Type-Length-Value fields in Continuity Check Messages.

9. A network element comprising an Ethernet switch, comprising:
a first port communicatively coupled to a far end switch forming an Ethernet service there between through a far end port on the far end switch; and
at least one additional port communicatively coupled to a Customer Premises Equipment (CPE) device;
wherein the network element is configured to:
transmit information related to an operational speed of the at least one additional port coupled to the CPE device;
receive information related to an operational speed of a connection between the far end switch and a second CPE device; and
trigger a modification to the Ethernet service by the network element, responsive to the network element determining a mismatch between the operational speed of the at least one additional port coupled to the CPE device and an operational speed of the connection.

10. The network element of claim 9, wherein at least one of the at least one additional port and the connection comprises a Link Aggregation Group (LAG).

11. The network element of claim 9, wherein the information comprises port type of either a physical port or an aggregated port, speed of a physical port in case of the physical port or speed of each aggregated port in the case of the aggregated port, and a count of active Link Aggregation Group (LAG) members in the case of the aggregated port.

12. The network element of claim 9, wherein a Maintenance Association is configured between the network element and the far end switch; and wherein the information is exchanged through the Maintenance Association as part of Connectivity Fault Management (CFM) IEEE 802.1ag Continuity Check Message (CCM) packets with an UP Maintenance entity group End Point (MEP).

13. The network element of claim 12, wherein a second Maintenance Association is configured between the at least one additional port and the CPE device, wherein a third Maintenance Association is configured between the far end switch and the second CPE device, wherein the second Maintenance Association and the third Maintenance Association comprise a DOWN MEP;
wherein the information related to the operational speed of the at least one additional port coupled to the CPE device is provided through the third Maintenance Association; and
wherein the information related to the operational speed of the connection is provided through the second Maintenance Association.

14. The network element of claim 13, wherein the Maintenance Association is configured with a lower Maintenance Domain than the second Maintenance Association and the third Maintenance Association.

15. The network element of claim 9, wherein the network element is configured to modify quality-of-service attributes of the Ethernet service responsive to the mismatch.

16. The network element of claim 9, wherein the network element is configured to transmit the information and receive the information through organization specific Type-Length-Value fields in Continuity Check Messages.

17. A network, comprising:
a first switch comprising first one or more ports;
a second switch comprising second one or more ports, wherein the second one or more ports are connected to the first one or more ports on the first switch forming an Ethernet service;
a first Customer Premises Equipment (CPE) device connected to the first switch via a first connection; and
a second CPE device connected to the second switch via a second connection, wherein the second CPE device communicates to the first CPE device over the Ethernet service;
wherein the first switch and the second switch are configured to
exchange information related to an operational speed of the first connection to the second switch and information related to an operational speed of the second connection to the first switch respectively;
wherein at least one of the first switch and the second switch is configured to trigger a modification to the Ethernet service, responsive to the at least one of the first switch and the second switch determining a mismatch between the operational speed of the first connection and the operational speed of the second connection;
configuring a Maintenance Association with the second switch with an UP Maintenance End Point (MEP) at the first connection and the second connection; and
exchanging the information through the Maintenance Association as part of Connectivity Fault Management (CFM) IEEE 802.1ag Continuity Check Message (CCM) packets.

18. The network of claim 17, wherein the first switch and the second switch exchange the information through organization specific Type-Length-Value fields in Continuity Check Messages.

19. The network of claim 17, wherein at least one of the first connection and the second connection comprises a Link Aggregation Group (LAG).

* * * * *